Dec. 27, 1960

F. E. HUGHES 2,965,996

MAGNETIC FISH LURE

Filed Sept. 12, 1957

INVENTOR
FREDERICK E. HUGHES

BY *Leech & Radue*

ATTORNEYS

United States Patent Office 2,965,996
Patented Dec. 27, 1960

2,965,996

MAGNETIC FISH LURE

Frederick E. Hughes, 3427 N. Utah St., Arlington 7, Va.

Filed Sept. 12, 1957, Ser. No. 683,633

2 Claims. (Cl. 43—42.22)

This invention relates to an improved artificial fish lure of the surface floating type which utilizes the pole seeking properties of permanent magnets to impart movement to the lure.

The ability of surface lures to create noisy lure action serves to initially attract game fish from the water's depths to investigate the nature of the disturbance. However, it is generally conceded that a successful surface lure depends additionally upon the skill of the fisherman in manipulating the lure in an erratic and lifelike manner. Numerous devices have been incorporated in such lures to assist the fisherman; such as cup-shaped heads, jointed body members, flexible lure bodies, propellers, spinners, tail-feathers, rubber tail skirts, and so forth. It has been found that many of these lure devices may provide improved results if the lure is frequently allowed to rest perfectly still on the water's surface and be subsequently activated in a lifelike manner which resembles the movements of an injured bait fish. It has also been observed that the major portion of successful strikes from game fish occur at the moment that a lure is appropriately activated after a short motionless pause. This critical phase of manipulating the lure is sometimes enhanced when the motionless lure has by chance turned at an angle from the attachment line thus resulting in a very lifelike swerving or twitching motion of the lure when tension is suddenly applied in a jerky manner thereto.

In view of the above, it is an object of this invention to provide a surface lure which will automatically turn to an offset position in relation to the direction of line attachment when the lure is given slack line in the water.

It is another object of this invention to provide a fish lure of the surface floating type which has attached thereto a permanent magnet having pole seeking properties so that when the fish line is slack the lure will turn in the water under the action of the permanent magnet in the direction of the earth's magnetic poles.

It is yet another object of this invention to provide a fish lure of the surface floating type with a manually adjustable permanent magnet so that the position of the magnet with respect to the lure may be varied.

It is a still further object to provide a fish lure with a manually adjustable permanent magnet with an indicator associated therewith so that the position of the poles of the magnet with respect to the lure body may be readily determined.

This invention will appear more clearly from the following detailed description when taken in conjunction with the accompanying drawing, showing by way of example, embodiments of this invention and wherein.

Figure 6:
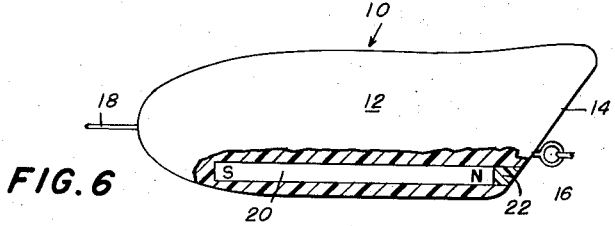

As shown in Figure 6, the fish lure 10 of this invention comprises a body 12 of suitable buoyant material having an upwardly and outwardly sloping face 14 to which is secured line attaching means 16. A hook may be secured to the after portion of the lure body as indicated at 18. A bar type permanent magnet 20 having spaced north-south poles is placed in a conforming cavity in the lure body and sealed in by means of suitable sealing material 22.

Figure 5:
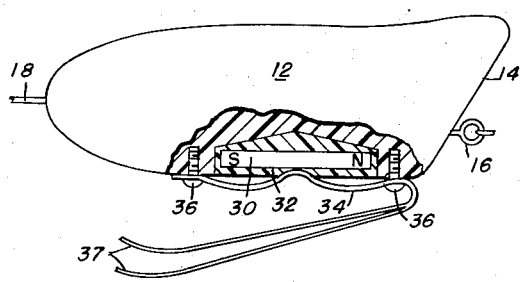
Fig. 5 is a side elevational view partly in section of a second embodiment and, Fig. 6 is a side elevational view partly in section of a third embodiment of this invention.

The embodiment shown in Figure 5 comprises the same general buoyant body 12 with upwardly sloping face 14 and line attaching means 16 mounted thereon. A hook is secured to the after portion of the lure body as generally indicated at 18. In this embodiment the permanent magnet 30 is embedded in a disk-like member 32 of non-magnetic material. The diameter of this disk is somewhat larger than the over-all length of the magnet. This disk is rotatably mounted in a conformingly shaped cavity in the bottom portion of the lure body. The magnet and disk assembly is resiliently held in position in the bottom of the lure body by spring 34 suitably secured to the bottom of the body by means of screws 36. A pair of spring wires 37 may extend rearwardly from the forward screw to act as weed guards to protect the hook.

Figure 1:
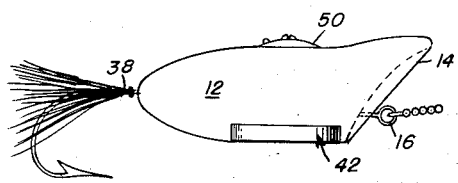
Fig. 1 is a side elevational view of a preferred embodiment of this fish lure.
Figure 2:
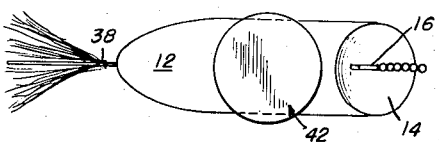
Fig. 2 is a bottom plan view of the device of Figure 1.
Figure 3:
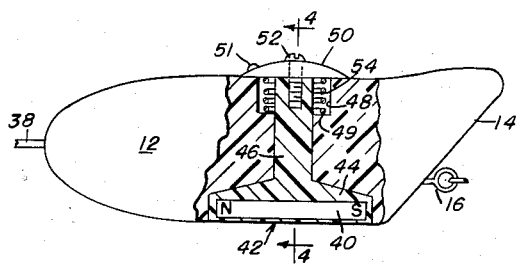
Fig. 3 is a side elevational view partly is section showing the details of the mounting of the permanent magnet of the device shown in Figure 1.
Figure 4:
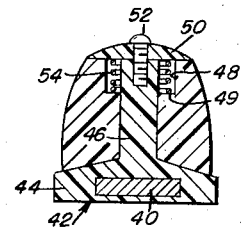
Fig. 4 is a vertical cross sectional view taken along line 4—4 of Figure 3.

The embodiment shown in Figures 1 through 4 has the same buoyant body 12 as the two previous embodiments with the same general upwardly sloping face 14 and line attaching means 16. The upwardly sloping face 14 may be somewhat dished-out as indicated in dotted lines in Figure 1 to make the lure into what is commonly known as a "popper" lure. A hook 38 is secured to the after portion of the lure body. As best shown in Figures 3 and 4 the bar type permanent magnet 40 is mounted in a non-magnetic carrier 42. The lower portion of this carrier is in the general shape of disk 44 whose diameter is somewhat greater than the length of the bar magnet 40. A rod-like section 46 extends centrally upward from the upper side of the disk 44. The lure body 12 has a vertical cavity whose configuration generally conforms to that of the carrier 42 with the larger portion of the cavity being in the bottom portion of the lure as indicated in Figure 3. It will be noted that the top portion of the cavity surrounding the upper portion of the rod-like member 46 is counterbored to produce a hole 48 of somewhat larger diameter than that of the rod 46.

In assembling the carrier 42 in the lure body 12, a circular indicator 50 is secured to the upper portion of rod 46 by means of screw 52 so that the lower face of indicator 50 will engage spring 54 which is positioned around the rod 46 in the counterbored hole 48. Spring 54 bears against the underside of indicator 50 and against the shoulder 49 of counterbored hole 48 to thereby cause the upper face of disk member 44 to engage the co-acting face of the body cavity to impart sufficient friction therebetween to hold the carrier 42 in adjusted position. It should be noted that the indicator 50 has a small projection 51 on its upper face to indicate the north pole end of the magnet 40. Obviously any other suitable indicia could be used to designate the position of the poles of the magnet.

All three of the described embodiments operate on the same principle namely, that the bar magnet is so positioned in the lure body that when the fish line is slackened the pole seeking characteristics of the magnet will cause the lure to be turned in a direction so that the magnet will align itself with the earth's magnetic poles. The embodiments shown in Figures 1 through 4 and 5 include manually adjustable magnets thus making it possible for the fisherman to predetermine the degree of angle which the lure will automatically assume when it rests on the water with a slack line. For example a series of casts normal to a north-south shore line would be favorably augmented by manually prepositioning of the magnet so that it is in line with the longitudinal axis of the lure which will, when the line is slackened, cause the lure to swing into the north-south heading. Obviously it is also possible that the fisherman may vary the amount of motion which he desires by appropriately positioning the magnet.

In view of the above discussion it appears that the use of this device is obvious and hence only a brief description will be given. In use, in case the fisherman does not know the compass directions in the location where he is fishing, he will merely cast out in any given direction and let his line slack up and determine the direction which the lure assumes. If the at rest position with slack line is not sufficiently out of line with the position when the line is taut then the setting of the magnet should be changed to effect the desired movement. Obviously when directions of casting are changed it would be desirable to modify the relative positions of the magnet and lure accordingly.

There is considerable latitude available in constructing a surface lure of this type. One or more magnets of the bar or rod type may be affixed in various manners to the lure to accomplish the purpose of this invention. However the embodiments discussed above indicate several ways of successfully practicing this invention.

Having thus described my invention, what I claim as novel and desire to secure by Letters Patent of the United States is:

1. A surface type fish lure comprising a body adapted to float on the water's surface, a hook fastened to the body, means for securing a line to the body so that when the line is taut the longitudinal axis of the body will be in alignment with the line, a bar type permanent magnet having spaced north and south poles, a carrier of non-magnetic material, said carrier comprising a disk-like base in which the magnet is fully embedded, said base having a rod-like portion extending centrally upward from one face of the disk, the body having a cavity generally conforming to the shape of the carrier, the carrier being rotatably mounted in said cavity, and means for retaining said carrier in the body cavity whereby when the line is slack the pole seeking characteristics of the magnet will cause the body to turn and align itself with the earth's magnetic poles, thus producing a wiggling action between slack and taut line condition.

2. The device as described in claim 1 and including an indicator secured to the upper end of the rod-like member, said indicator being oriented with respect to the bar magnet.

References Cited in the file of this patent
UNITED STATES PATENTS

| | | |
|---|---|---|
| 1,093,577 | Palmer | Apr. 14, 1914 |
| 1,595,801 | McDonald | Aug. 10, 1926 |
| 2,459,819 | Hoage | Jan. 25, 1949 |
| 2,575,626 | Issaac | Nov. 20, 1951 |
| 2,738,610 | Rice | Mar. 20, 1956 |

FOREIGN PATENTS

| | | |
|---|---|---|
| 894,516 | Germany | Oct. 26, 1953 |